US012710868B2

(12) United States Patent
Iorio et al.

(10) Patent No.: US 12,710,868 B2
(45) Date of Patent: Aug. 18, 2026

(54) CURRENT MANAGEMENT DURING DATA BURST OPERATIONS IN A MULTI-DIE MEMORY DEVICE

(71) Applicant: Micron Technology, Inc., Boise, ID (US)

(72) Inventors: Biagio Iorio, Luco dei Marsi (IT); Luca Nubile, Sulmona (IT); Walter Di Francesco, Avezzano (IT); Jeremy Binfet, Boise, ID (US); Liang Yu, Boise, ID (US); Yankang He, Mountain View, CA (US); Ali Mohammadzadeh, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 18/407,239

(22) Filed: Jan. 8, 2024

(65) Prior Publication Data

US 2024/0241643 A1 Jul. 18, 2024

Related U.S. Application Data

(60) Provisional application No. 63/439,027, filed on Jan. 13, 2023.

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01); *G06F 2212/7207* (2013.01)

(58) Field of Classification Search
CPC ...... G06F 3/061; G06F 3/0659; G06F 3/0679; G06F 2212/7207
See application file for complete search history.

(56) References Cited

U.S. PATENT DOCUMENTS 8,788,779 B1 * 7/2014 Horn .................... G06F 3/0655 713/321
9,443,600 B2 * 9/2016 Ghalam ................ G06F 1/3275
(Continued)

*Primary Examiner* — Kalpit Parikh
(74) *Attorney, Agent, or Firm* — Lowenstein Sandler LLP

(57) ABSTRACT

Control logic on a memory die of a multi-die memory sub-system receives, from a memory sub-system controller, a data burst command indicating an upcoming data burst event and determines an expected current utilization in the memory sub-system during the data burst event. The control logic further determines whether the expected current utilization in the memory sub-system during the data burst event satisfies a threshold criterion and responsive to determining that the expected current utilization in the memory sub-system during the data burst event does not satisfy the threshold criterion, pauses one or more operations being executed by the control logic on the memory die until the expected current utilization in the memory sub-system during the data burst event satisfies the threshold criterion. Responsive to determining that the expected current utilization in the memory sub-system during the data burst event satisfies the threshold criterion, the control logic provides, to the memory sub-system controller, an indication that the data burst event is approved and can perform one or more operations corresponding to the data burst event.

17 Claims, 7 Drawing Sheets

(56) References Cited

U.S. PATENT DOCUMENTS

| | | | | |
|---|---|---|---|---|
| 2019/0065086 | A1 * | 2/2019 | Margetts | G06F 13/1668 |
| 2021/0117335 | A1 * | 4/2021 | Kondo | G11C 16/0483 |
| 2022/0382466 | A1 * | 12/2022 | Zhu | G06F 3/0653 |
| 2023/0195312 | A1 * | 6/2023 | Yu | G06F 1/3275 711/103 |

* cited by examiner

FIG. 4

CURRENT MANAGEMENT DURING DATA BURST OPERATIONS IN A MULTI-DIE MEMORY DEVICE

TECHNICAL FIELD

This application claims the benefit of U.S. Provisional Patent Application No. 63/439,027, filed Jan. 13, 2023, the entire contents of which are hereby incorporated by reference herein.

TECHNICAL FIELD

Embodiments of the disclosure relate generally to memory sub-systems, and more specifically, relate to current management during data burst operations in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 4 is a flow diagram of an example method of current management during data burst operations in a memory device of a memory sub-system in accordance with some embodiments of the present disclosure.

DETAILED DESCRIPTION

Figure 1A:
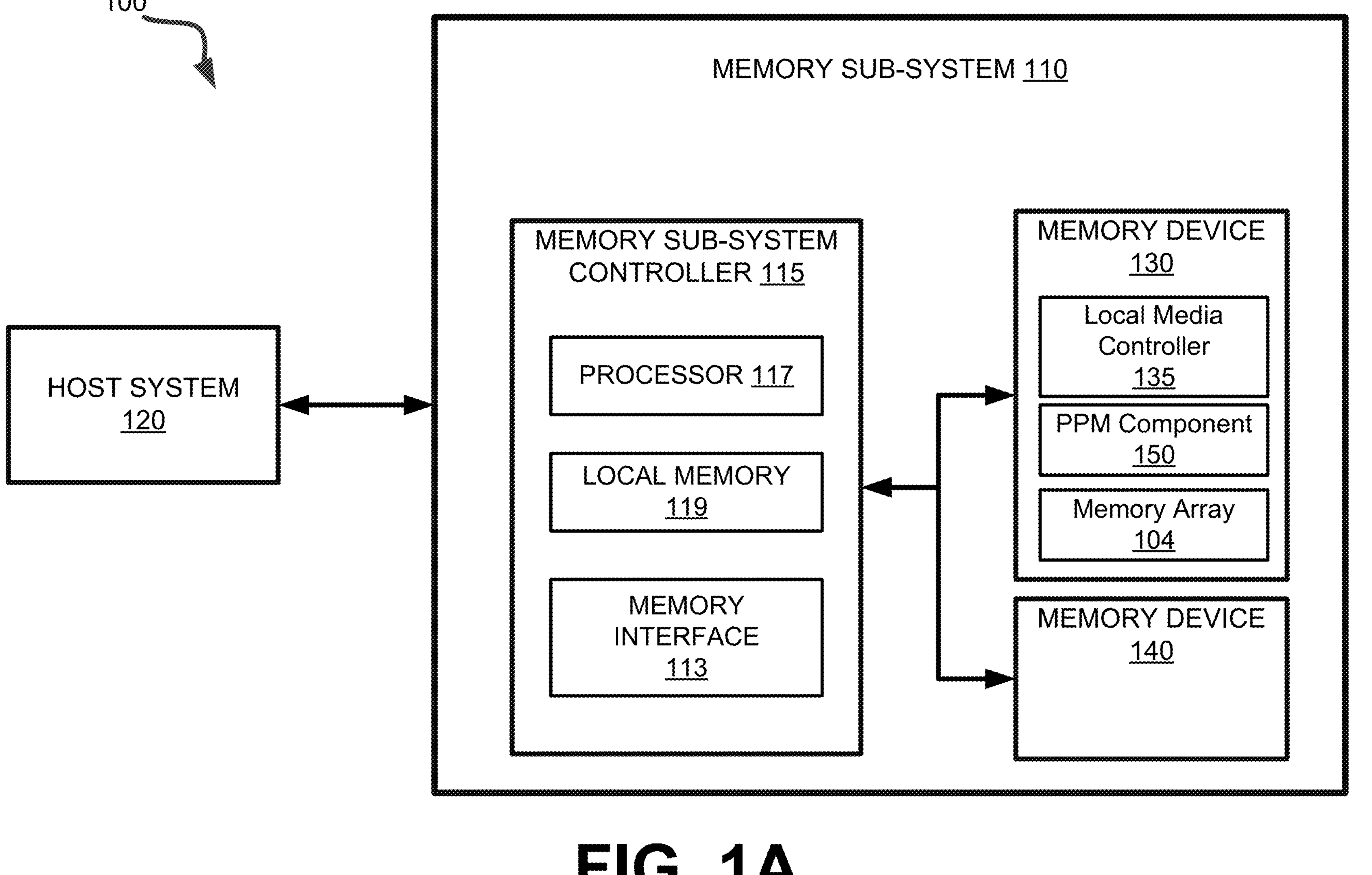
FIG. 1A illustrates an example computing system that includes a memory sub-system in accordance with some embodiments of the present disclosure.

Aspects of the present disclosure are directed to current management during data burst operations in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices (i.e., memory dies) and a memory sub-system controller to manage the non-volatile memory devices. In a memory sub-system including multiple memory dies, associated memory access operations can be performed concurrently (i.e., at least partially overlapping in time) on the separate memory dies. Various access lines, data lines and voltage nodes can be charged or discharged very quickly during sense (e.g., read or verify), program, and erase operations so that memory access operations can meet the performance specifications that are often required to satisfy data throughput targets as might be dictated by customer requirements or industry standards, for example. For sequential read or programming, multi-plane operations are often used to increase the system throughput. As a result, the memory sub-system can have a high peak current usage, which might be four to five times the average current amplitude. Thus, with such a high average market requirement of total current usage budget, it can become challenging to operate more than certain number of memory devices (i.e., memory dies) concurrently, for example.

One type of data transfer that can occur in the memory sub-system is a data burst transfer (i.e., a "data burst event"), which refers to a continuous set of data input or data output transfer cycles between the memory sub-system controller and the memory dies that are performed without interruption. A data burst event can be initiated by specifying a set of parameters including a starting memory address from where to begin the data transfer, and an amount of data to be transferred. After the data burst is initiated, it runs to completion, using as many interface bus transactions as necessary to transfer the amount of data designated by the set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks. Data burst events are generally fast (e.g., about 1-2 microseconds) and asynchronous events (e.g., a memory device cannot forecast when a data burst will occur). One example of a data burst is a read burst. Another example of a data burst is a write burst.

The occurrence of a data burst event can consume significant current in the memory sub-system, and when such a data burst occurs concurrently with other ongoing operations which also consume system current, can cause a total current limit in the memory sub-system to be reached or exceeded. Such an occurrence can cause undesired results in the memory sub-system, such as but not limited to, an asynchronous reset event triggered by supply voltage drop that interrupts all ongoing memory access operations and potentially causes shutdown of one or more components. Certain memory sub-systems utilize peak power management (PPM) techniques to manage power consumption, many of which rely on the memory sub-system controller to stagger the activity of the memory dies seeking to avoid performing high power portions of memory access operations concurrently in more than one die. A PPM communication protocol can be used, which is an inter-die communication protocol that limits and/or tracks current or power consumed by each memory die in the memory sub-system. Each memory die can include a PPM component that exchanges information with its own local media controller (e.g., NAND controller) and other PPM components of the other dies via a communication bus. Such PPM techniques, however, are not equipped to handle or manage data burst events. Accordingly, many memory sub-systems artificially lower the available current budget in the memory sub-system, so as to be able to always reserve some portion of the current budget for high-priority data burst operations that may or may not occur. This impacts the number of non-data burst operations that can be performed concurrently and hurts system performance.

Aspects of the present disclosure address the above and other deficiencies by implementing current management during data burst operations in a memory device of a memory sub-system. In one embodiment, a dedicated command is used to instruct the memory devices in a multi-die memory sub-system to reserve a specific amount of current budget to handle data burst events without exceeding the maximum allowable current budget in the memory sub-system. A requestor, such as a memory sub-system controller or host system, can issue these commands when a data burst event is forthcoming (i.e., is identified based on the read/write workload). In this manner, the PPM components of the memory devices can utilize the full available current budget for non-data burst operations at times when no data burst event is expected, but can interrupt those operations in response to receiving the command to recapture some current budget for use during the data burst event. The reserved current budget can be released upon completion of the data burst event.

Advantages of this approach include, but are not limited to, improved performance in the memory sub-system. The dedicated command to reserve current budget for upcoming data burst events provides automatic control of current utilization in the memory sub-system, which is adapted to actual current consumption at each individual moment. The memory devices do not need to always have a certain amount of current budget reserved, just in case a high-priority data burst event is to occurs. This allows more current budget to be utilized for non-data burst operations and reduces the occurrence of asynchronous reset events in the memory sub-system.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command, a confirmation that a program command was successfully performed, or an indication of a multi-tiered health status information corresponding to one or more segments of the memory device 130. In some embodiments, the memory sub-system controller 115 includes at least a portion of the memory interface 113. For example, the memory sub-system controller 115 can include a processor 117 (e.g., a processing device) configured to execute instructions stored in local memory 119 for performing the operations described herein. In some embodiments, the memory interface component 113 is part of the host system 120, an application, or an operating system.

In one embodiment, memory device 130 includes local media controller 135, peak power management component 150, and memory array 104. As described herein, the memory array 104 can be logically or physically divided into a number of segments (e.g., dies, blocks, pages, etc.). In one embodiment, local media controller 135 of memory device 130 includes at least a portion of PPM component 150. In such an embodiment, PPM component 150 can be implemented using hardware or as firmware, stored on memory device 130, executed by the control logic (e.g., local media controller 135) to perform the operations related to power budget arbitration for multiple concurrent access operations described herein. In another embodiment, PPM component 150 is separate from local media controller 135. In one embodiment, memory device 130 is representative of a single memory die. In one embodiment, memory sub-system 110 includes multiple memory dies, with each memory die including the same or similar components as memory device 130, including a respective instance of PPM component 150.

In one embodiment, the PPM component 150 receives, from a requestor, such as memory sub-system controller 115 or host system 120, a data burst command indicating an upcoming data burst event and determines an expected current utilization in the memory sub-system 110 during the data burst event. PPM component 150 further determines whether the expected current utilization in the memory sub-system 110 during the data burst event satisfies a threshold criterion, and responsive to determining that the expected current utilization in the memory sub-system during the data burst event does not satisfy the threshold criterion, pauses one or more operations being executed on memory array 104 of memory device 130 until the expected current utilization in the memory sub-system 110 during the data burst event satisfies the threshold criterion. Responsive to determining that the expected current utilization in the memory sub-system 110 during the data burst event satisfies the threshold criterion, PPM component 150 provides, to the requestor, an indication that the data burst event is approved and can perform one or more operations corresponding to the data burst event. Upon completion of the data burst event, PPM component 150 receives a data burst release command indicating the data burst event is completed and can resume the paused one or more operations being executed on the memory device 130. Further details with regards to the design and operation of PPM component 150 are described below.

Figure 1B:
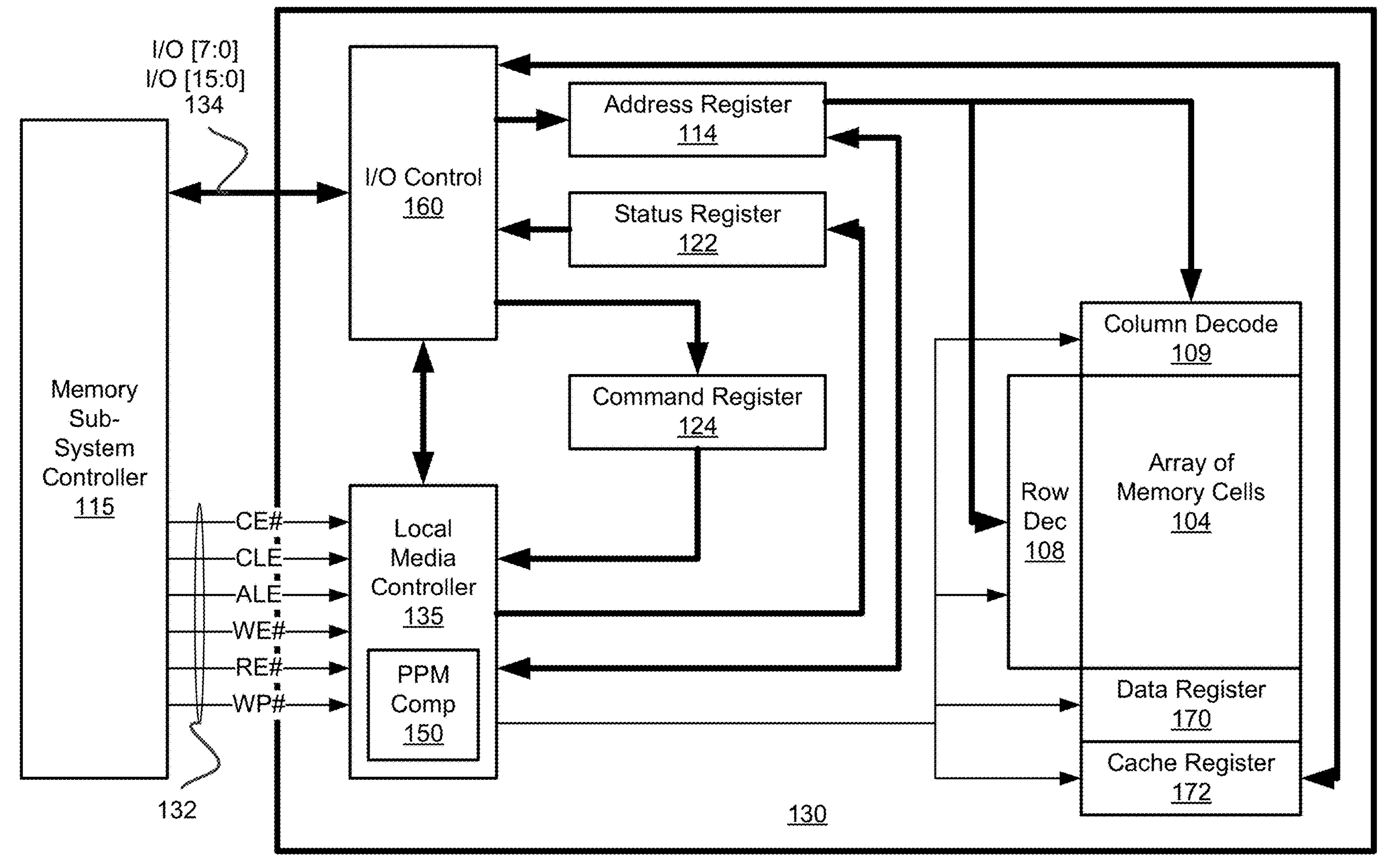
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes or is coupled to the PPM component 150, which can implement the current management described herein during data burst operations.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
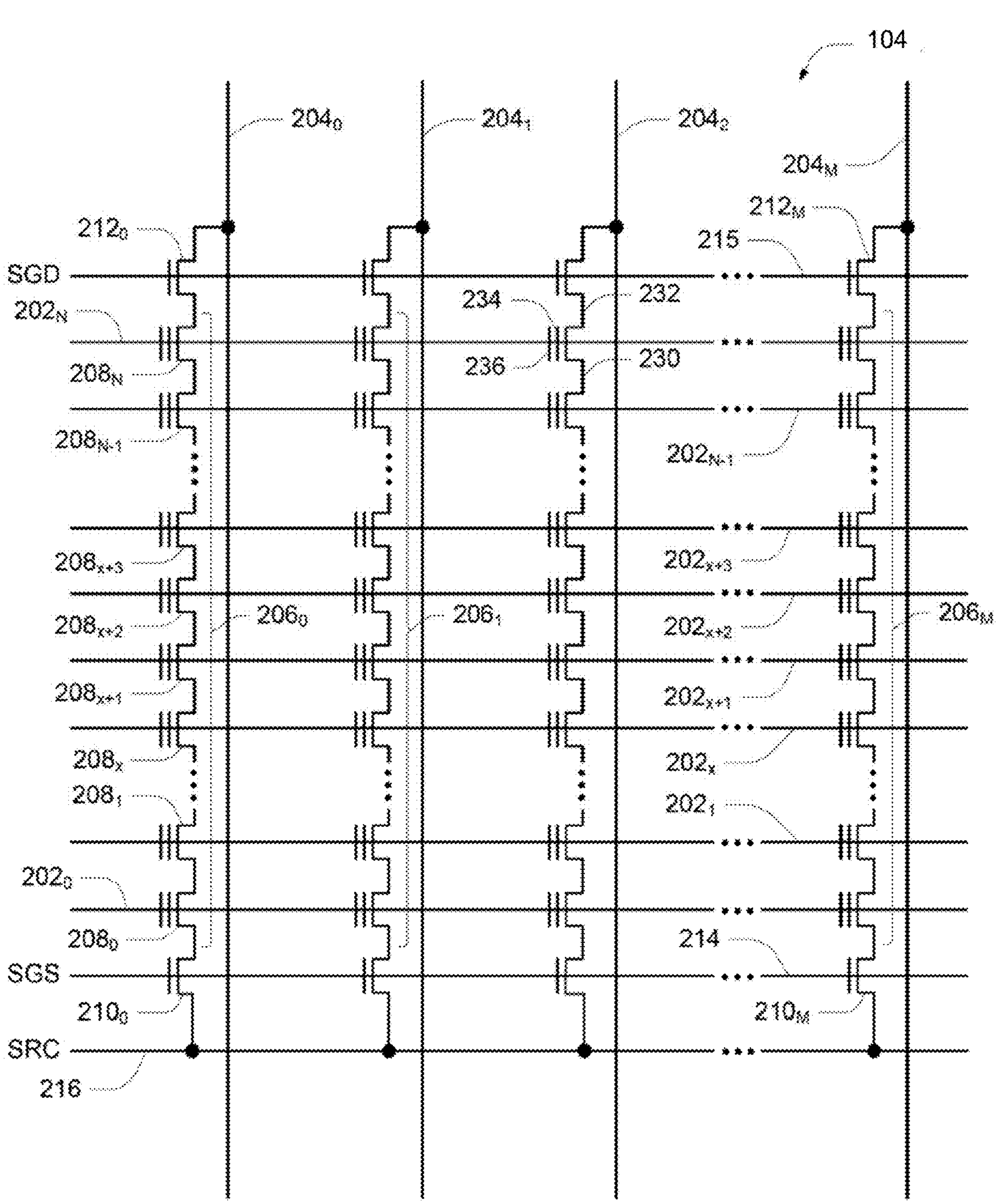
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $\mathbf{202}_0$ to $\mathbf{202}_N$, and data lines, such as bit lines $\mathbf{204}_0$ to $\mathbf{204}_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $\mathbf{206}_0$ to $\mathbf{206}_M$. Each NAND string 206 can be connected (e.g., selectively connected) to a common source (SRC) 216 and can include memory cells $\mathbf{208}_0$ to $\mathbf{208}_N$. The memory cells 208 can represent non-volatile memory cells for storage of data. The memory cells 208 of each NAND string 206 can be connected in series between a select gate 210 (e.g., a field-effect transistor), such as one of the select gates $\mathbf{210}_0$ to $\mathbf{210}_M$ (e.g., that can be source select transistors, commonly referred to as select gate source), and a select gate 212 (e.g., a field-effect transistor), such as one of the select gates $\mathbf{212}_0$ to $\mathbf{212}_M$ (e.g., that can be drain select transistors, commonly referred to as select gate drain). Select gates $\mathbf{210}_0$ to $\mathbf{210}_M$ can be commonly connected to a select line 214, such as a source select line (SGS), and select gates $\mathbf{212}_0$ to $\mathbf{212}_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $\mathbf{208}_0$ of the corresponding NAND string 206. For example, the drain of select gate $\mathbf{210}_0$ can be connected to memory cell $\mathbf{208}_0$ of the corresponding NAND string $\mathbf{206}_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $\mathbf{212}_0$ can be connected to the bit line $\mathbf{204}_0$ for the corresponding NAND string $\mathbf{206}_0$. The source of each select gate 212 can be connected to a memory cell $\mathbf{208}_N$ of the corresponding NAND string 206. For example, the source of select gate $\mathbf{212}_0$ can be connected to memory cell $\mathbf{208}_N$ of the corresponding NAND string $\mathbf{206}_0$. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline 202 N and selectively connected to even bit lines 204 (e.g., bit lines $\mathbf{204_0}$, $\mathbf{204_2}$, $\mathbf{204_4}$, etc.) can be one physical page of the memory cells 208 (e.g., even memory cells) while memory cells 208 commonly connected to wordline $\mathbf{202_N}$ and selectively connected to odd bit lines 204 (e.g., bit lines $\mathbf{204_1}$, $\mathbf{204_3}$, $\mathbf{204_5}$, etc.) can be another physical page of the memory cells 208 (e.g., odd memory cells).

Although bit lines $\mathbf{204_3}$-$\mathbf{204_5}$ are not explicitly depicted in FIG. 2, it is apparent from the figure that the bit lines 204 of the array of memory cells 104 can be numbered consecutively from bit line $\mathbf{204_0}$ to bit line $\mathbf{204_M}$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $\mathbf{202_0}$-$\mathbf{202_N}$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
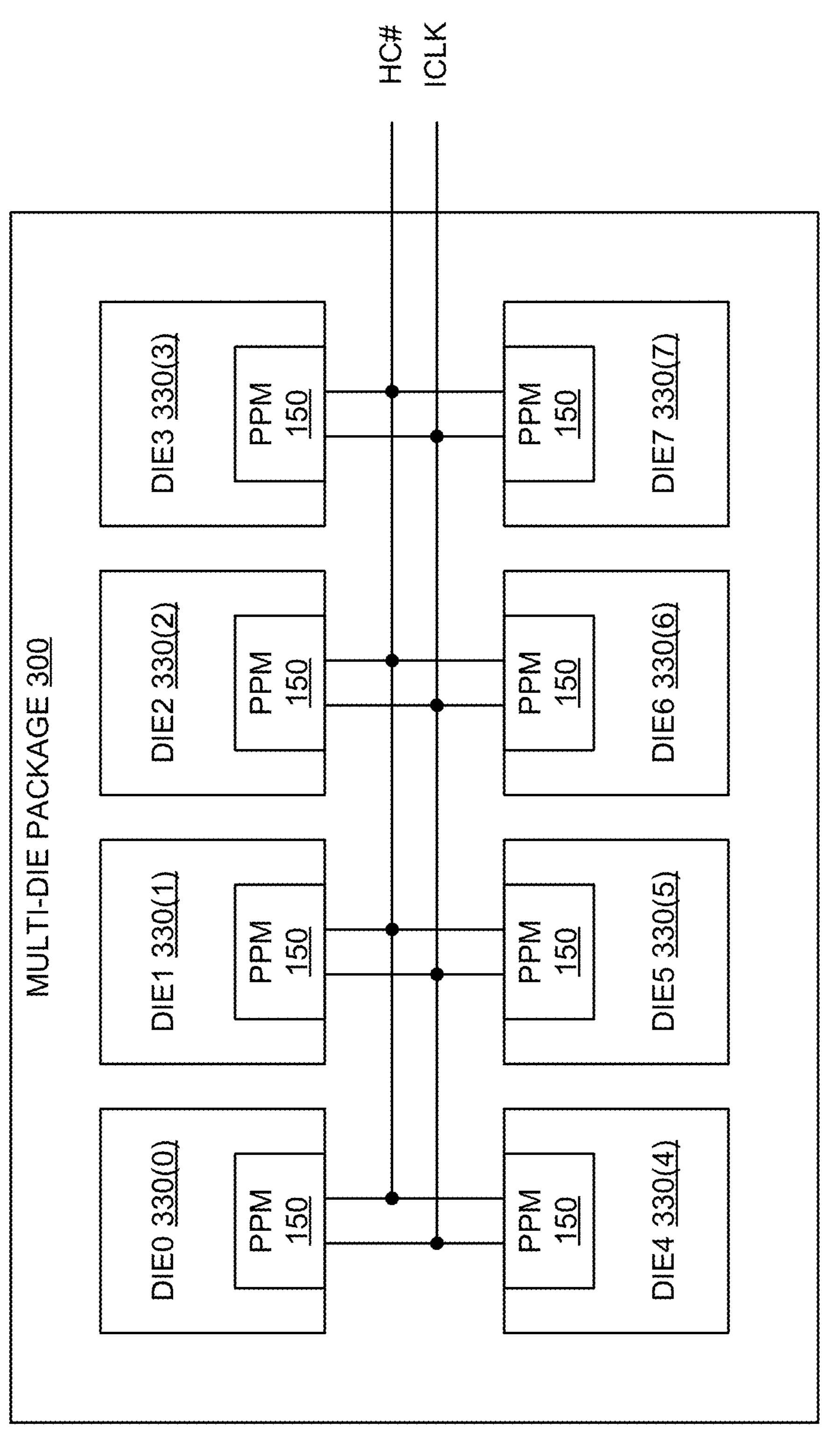
FIG. 3 is a block diagram illustrating a multi-die package with multiple memory dies in a memory sub-system in accordance with some embodiments of the present disclosure.

FIG. 3 is a block diagram illustrating a multi-die package with multiple memory dies in a memory sub-system in accordance with some embodiments of the present disclosure. As illustrated, multi-die package 300 includes either memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g., via a control link), and can communicate over a separate I/O bus. In addition, a peak current magnitude indicator signal HC# is commonly shared between the memory dies 330(0)-330(7). The peak current magnitude indicator signal HC# can be normally pulled to a particular state (e.g., pulled high). In one embodiment, each of memory dies 330(0)-330(7) includes an instance of PPM component 150, which receives both the clock signal ICLK and the peak current magnitude indicator signal HC#.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 150 holds this token (e.g., a certain number of cycles of clock signal ICLK) can be referred to herein as a power management cycle of the associated memory die. At the end of the power management cycle, the token is passed to a next memory die in sequence. Eventually the token is received again by the same PPM component 150 which signals the beginning of a new power management cycle for the associated memory die. In one embodiment, the encoded value for the lowest expected peak current magnitude is configured such that each of its digits correspond to the normal logic level of the peak current magnitude indicator signal HC# where the disabled dies do not transition the peak current magnitude indicator signal HC#. In other embodiments, however, the memory dies can be configured, when otherwise disabled in response to their respective chip enable signal, to drive transitions of the peak current magnitude indicator signal HC# to indicate the encoded value for the lowest expected peak current magnitude upon being designated. When a given PPM component 150 holds the token, it can determine the peak current magnitude for the respective one of memory die 330(0)-330(7), which can be attributable to one or more processing threads on that memory die, and broadcast an indication of the same via the peak current magnitude indicator signal HC#.

Figure 4:
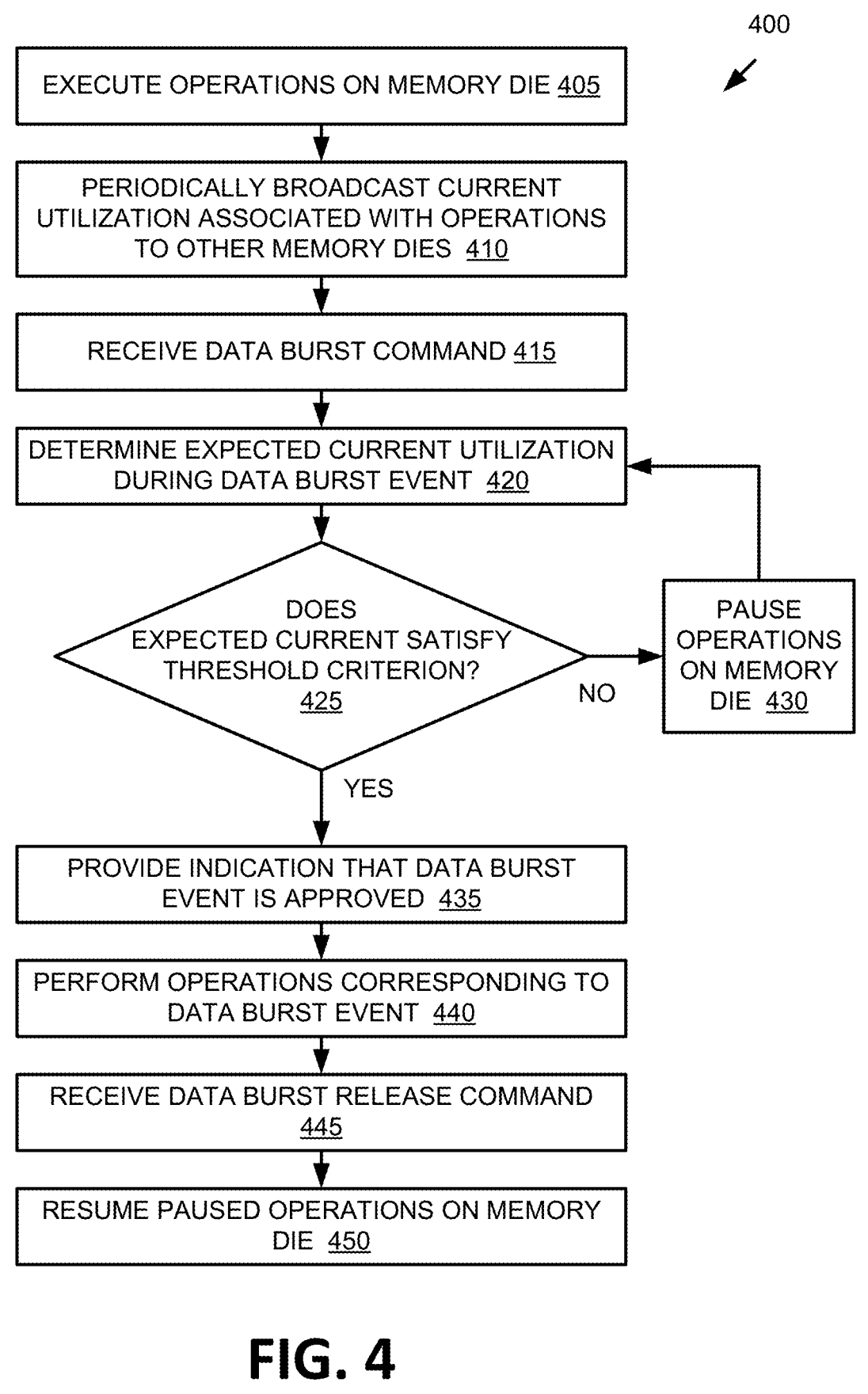

FIG. 4 is a flow diagram of an example method of determining a multi-tier health status in a memory device of a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by PPM component 150 of FIG. 1A, FIG. 1B, and FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
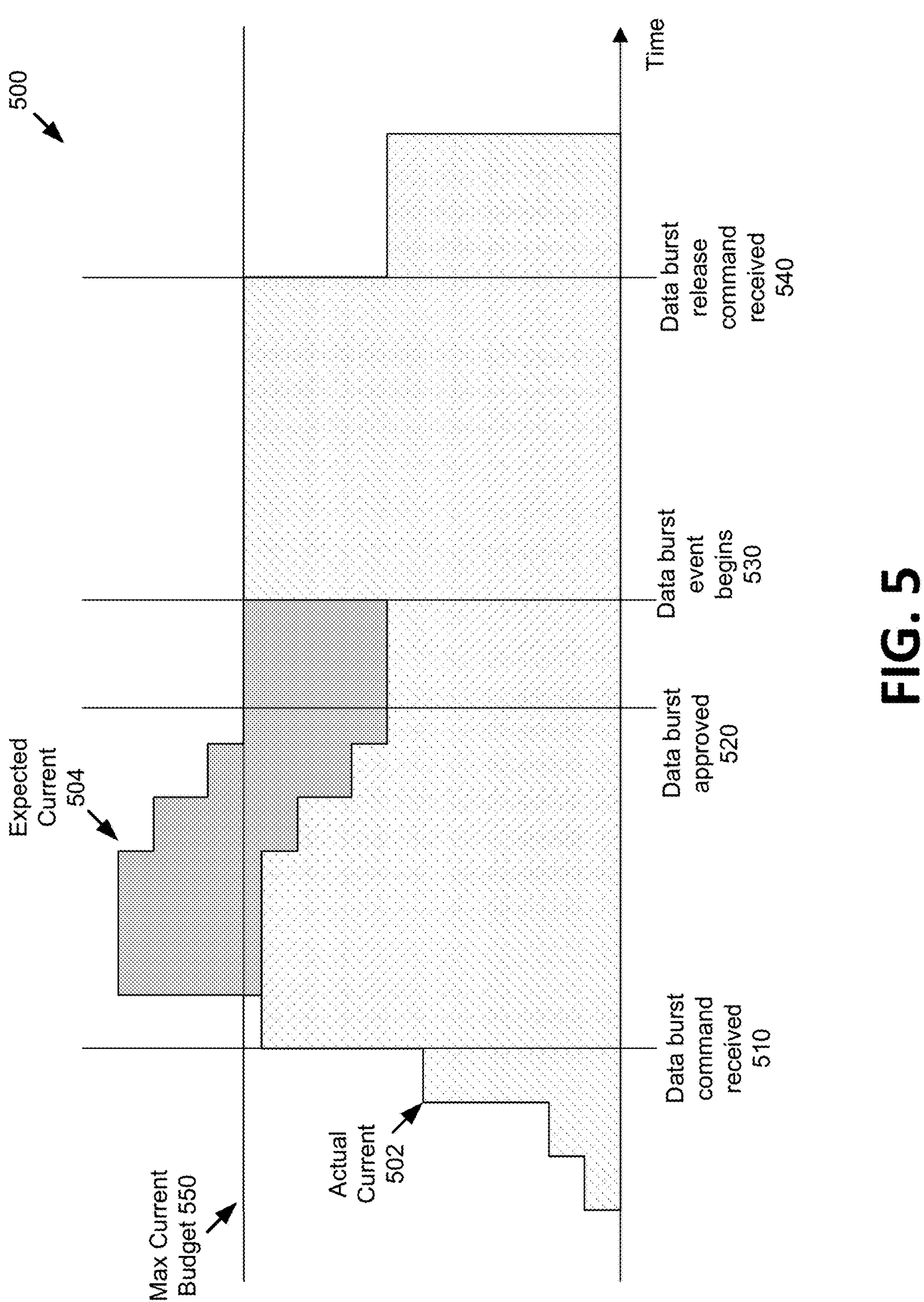
FIG. 5 is diagram illustrating utilization during data burst operations in a memory device of a memory sub-system in accordance with some embodiments of the present disclosure.

At operation 405, memory operations are executed. For example, control logic (e.g., local media controller 135) can execute one or more operations on a memory die, such as memory device 130. Depending on the embodiment, the operations can include read, write, or erase operations, or a combination of any type of memory operation. For example, the control logic can cause program or read voltage signals to be applied to access lines (e.g., bit lines and word lines) of memory array 104 to program data to or read data from corresponding memory cells. These operations can include host-initiated operations (i.e., performed in response to a request or command received from host system 120 or memory sub-system controller 115) or internal media management operations. Any such operations utilize a certain amount of current in the memory sub-system, however, this amount of current is typically less than a maximum allowable current budget. For example, as shown in FIG. 5, the actual current 502 utilized to perform these operations (i.e., in the period of time before a data burst command is received at time 510) remains less than the maximum allowable current budget 550.

At operation 410, information is broadcast. For example, control logic (e.g., PPM component 150) can periodically broadcast a current utilization associated with the one or more operations to a plurality of other memory devices in the memory sub-system 110. In one embodiment, when the memory device 130 holds the token, as described above with respect to FIG. 3, the control logic can cause an indication of the current utilization to be broadcast to other memory dies via the peak current magnitude indicator signal HC# as part of a shared data packet. In this manner, the PPM component 150 on each memory die in the memory sub-system 110 is made aware of the current utilization on each of the other memory dies.

At operation 415, a command is received. For example, the control logic can receive, from a requestor such as memory sub-system controller 115 or host system 120, a data burst command indicating an upcoming data burst event. A data burst event occurs when a continuous set of data input or data output transfer cycles between the memory sub-system controller 115 and the memory dies, such as memory device 130, are performed without interruption. Memory sub-system controller 115 can buffer incoming requests from host system 120, for example, and thus can preemptively determine when a data burst event is going to occur. In another embodiment, based on historical trends, for example, memory sub-system controller 115 can predict the occurrence of a future data burst event based on current memory access workloads. The data burst command can be a dedicated command having a unique header or other identifier which can be recognized by PPM component 150. The same command can be sent to and received by each other memory die in the memory sub-system. In one embodiment, the data burst command includes additional information, such as a number of data bursts that are to occur within a certain period of time.

At operation 420, a determination is made. For example, the control logic can determine an expected current utilization in the memory sub-system 110 during the data burst event. In one embodiment, the expected current utilization in the memory sub-system 110 during the data burst event includes a combination of the current utilization associated with the one or more operations (i.e., the actual current utilization 502) with an estimated current utilization associated with the data burst event. In one embodiment, PPM component 150 can be preconfigured with a default amount of current utilization associated with a data burst event. Accordingly, based on the number of data bursts indicated in the data burst command, the PPM component 150 can determine the estimated current utilization.

At operation 425, a determination is made. For example, the control logic can determine whether the expected current utilization in the memory sub-system 110 during the data burst event satisfies a threshold criterion. In one embodiment, the expected current utilization satisfies the threshold criterion if the expected current utilization will remain below a threshold level (e.g., the maximum allowable current budget 550 for the plurality of memory dies in the memory sub-system 110). As shown in FIG. 5, the expected current 504 includes the actual current 502 plus some additional amount of current utilization (i.e., the default amount associated with a data burst event). In the period of time after the data burst command is received at time 510, the expected current increases above the maximum allowable current budget 550, which would normally trigger an asynchronous reset event. Since the expected current 504 is not an actual current utilization, however, no reset occurs. The expected current 504, however, does not satisfy the threshold criterion, as the expected current 504 is greater than the maximum allowable current budget 550.

At operation 430, memory operations are paused. Responsive to determining that the expected current utilization during the data burst event does not satisfy the threshold criterion, the control logic can pause the one or more operations being executed by the control logic on the memory device until the expected current utilization in the memory sub-system during the data burst event satisfies the threshold criterion. For example, in one embodiment, the PPM component 150 on each memory die can, in response to the determination to pause the operations, refuse all requests from to increase current utilization associated with the memory operations being performed. The PPM component 150 can, however, continue to communicate decreases in current utilization, such as those associated with the completion of memory operations, to the other memory dies. In this manner, the current to perform the data burst event will be freed up. As shown in FIG. 5, the expected current 504 increases significantly when a data burst command is received at time 510. In the period of time that follows, however, it is shown that the expected current 504 and the actual current 502 both systematically decrease (i.e., step down) as a result of the one or more operations being paused. The current budget that was being utilized by those operations is freed up and made available to accommodate the upcoming data burst command The control logic continues to track the expected current 504 and repeatedly compares the expected current 504 to the maximum current budget 550.

At operation 435, an indication is provided. Responsive to determining that the expected current utilization during the data burst event satisfies the threshold criterion (i.e., is at or below the maximum current budget 550), either initially or after one or more operations have been paused, the control logic can provide, to the requestor, an indication that the data burst event is approved. As shown in FIG. 5, once the expected current 504 reaches the maximum current budget 550, the data burst approval can occur at time 520. In one embodiment, to provide the indication that the data burst event is approved, the control logic can set a corresponding bit in a status register to a specific value. In one embodiment, PPM component 150 periodically or continuously sends a signal to memory sub-system controller 115 indicating the status of that corresponding bit (i.e., whether the data burst is approved or not). In another embodiment, the memory sub-system controller 115 can periodically poll the status register to determine if the corresponding bit is set to the specific value.

At operation 440, operations are performed. For example, the control logic can perform one or more operations corresponding to the data burst event. As shown in FIG. 5, the data burst begins at time 530 and the operations performed can correspond to a period of uninterrupted data transfer either to or from the plurality of memory dies in memory sub-system 110. During the data burst event, the actual current 502 increases and likely reaches or is close to the maximum current budget 550.

At operation 445, a command is received. For example, the control logic can receive, from the requestor, a data burst release command indicating that the data burst event is completed. Since memory sub-system controller 115 is aware of the upcoming workload, it can determine when the data burst event will end and, in response, can send the data burst release command to each of the memory dies in the memory sub-system 110. The data burst release command can be a dedicated command having a unique header or other identifier which can be recognized by PPM component 150. As shown in FIG. 5, the data burst release command can be received at time 540.

At operation 450, paused operations are resumed. Responsive to receiving the data burst release command, the control logic can resume the paused one or more operations being executed on the memory device 130. In one embodiment, the PPM component 150 on each die will poll the available current each time the corresponding die receives the token until there is enough current available to resume the previously paused memory operations. When the current associated with the data burst event is released, the PPM component 150 will see enough available current budget and will send confirmation to the control logic to resume the one or more operations and to consume the value of current previously requested. As shown in FIG. 5, since the additional current budget that was utilized during the data burst event is no longer present, the actual current 502 may drop below the maximum current budget 550.

Figure 6:
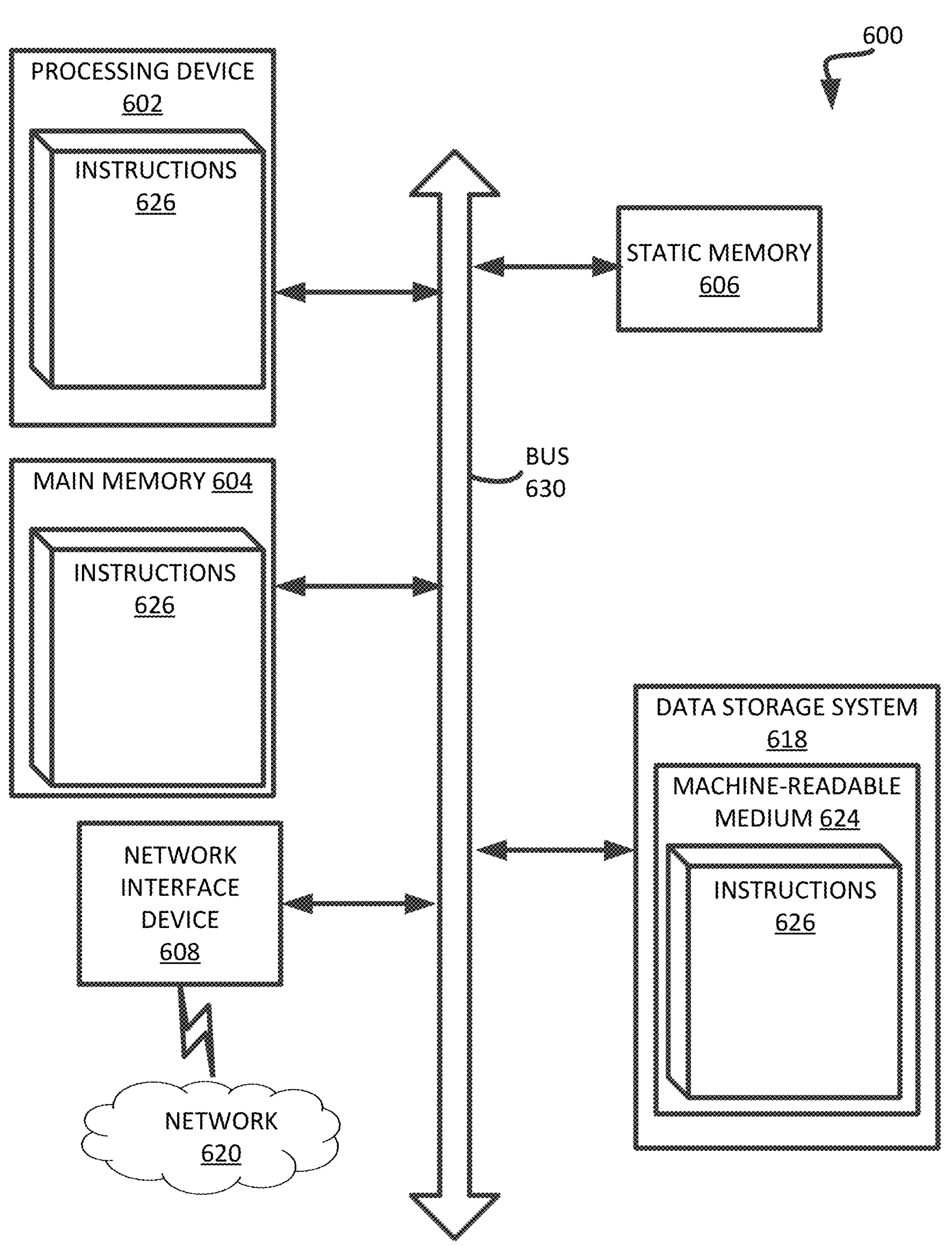
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the local media controller 135 of FIG. 1A. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
a memory sub-system controller; and
a plurality of memory dies coupled to the memory sub-system controller, wherein each memory die of the plurality of memory dies comprises:
a memory array; and
control logic, operatively coupled with the memory array, to perform operations comprising:
executing the one or more operations on the memory die;
periodically broadcasting a current utilization associated with the one or more operations to other memory dies of the plurality of memory dies;
receiving, from the memory sub-system controller, a data burst command indicating an upcoming data burst event;
determining an expected current utilization in the memory sub-system during the data burst event;
determining whether the expected current utilization in the memory sub-system during the data burst event satisfies a threshold criterion;
responsive to determining that the expected current utilization in the memory sub-system during the data burst event does not satisfy the threshold criterion, pausing one or more other ongoing operations not associated with the data burst event that are being executed by the control logic on the memory die until the expected current utilization in the memory sub-system during the data burst event satisfies the threshold criterion; and
responsive to determining that the expected current utilization in the memory sub-system during the data burst event satisfies the threshold criterion, providing, to the memory sub-system controller, an indication that the data burst event is approved.

2. The memory sub-system of claim 1, wherein determining the expected current utilization in the memory sub-system during the data burst event comprises combining the current utilization associated with the one or more operations with an estimated current utilization associated with the data burst event.

3. The memory sub-system of claim 1, wherein determining whether the expected current utilization in the memory sub-system during the data burst event satisfies a threshold criterion comprises determining whether the expected current utilization in the memory sub-system during the data burst event will remain below a maximum allowable current budget for the plurality of memory dies in the memory sub-system.

4. The memory sub-system of claim 1, wherein providing the indication that the data burst event is approved comprises setting a corresponding bit in a status register to a specific value, wherein the memory sub-system controller is to periodically poll the status register to determine if the corresponding bit is set to the specific value.

5. The memory sub-system of claim 1, wherein the control logic is to perform operations further comprising:
performing one or more operations corresponding to the data burst event, wherein the one or more operations correspond to a period of uninterrupted data transfer either to or from the plurality of memory dies.

6. The memory sub-system of claim 1, wherein the control logic is to perform operations further comprising:
receiving, from the memory sub-system controller, a data burst release command indicating that the data burst event is completed; and
responsive to receiving the data burst release command, resuming the paused one or more other congoing operations being executed on the memory die.

7. A memory device comprising:

a memory array; and control logic, operatively coupled with the memory array, to perform operations comprising:

executing the one or more operations on the memory device;

periodically broadcasting a current utilization associated with the one or more operations to a plurality of other memory devices;

receiving, from a requestor, a data burst command indicating an upcoming data burst event;

determining an expected current utilization during the data burst event;

determining whether the expected current utilization during the data burst event satisfies a threshold criterion;

responsive to determining that the expected current utilization during the data burst event does not satisfy the threshold criterion, pausing one or more other ongoing operations not associated with the data burst event that are being executed by the control logic on the memory device until the expected current utilization during the data burst event satisfies the threshold criterion; and responsive to determining that the expected current utilization during the data burst event satisfies the threshold criterion, providing, to the requestor, an indication that the data burst event is approved.

8. The memory device of claim 7, wherein determining the expected current utilization during the data burst event comprises combining the current utilization associated with the one or more operations with an estimated current utilization associated with the data burst event.

9. The memory device of claim 7, wherein determining whether the expected current utilization during the data burst event satisfies a threshold criterion comprises determining whether the expected current utilization during the data burst event will remain below a maximum allowable current budget.

10. The memory device of claim 7, wherein providing the indication that the data burst event is approved comprises setting a corresponding bit in a status register to a specific value, wherein the requestor is to periodically poll the status register to determine if the corresponding bit is set to the specific value.

11. The memory device of claim 7, wherein the control logic is to perform operations further comprising:

performing one or more operations corresponding to the data burst event, wherein the one or more operations correspond to a period of uninterrupted data transfer either to or from the memory device.

12. The memory device of claim 7, wherein the control logic is to perform operations further comprising:

receiving, from the requestor, a data burst release command indicating that the data burst event is completed; and responsive to receiving the data burst release command, resuming the paused one or more other ongoing operations being executed on the memory device.

13. A method comprising:

executing the one or more operations on the memory device;

periodically broadcasting a current utilization associated with the one or more operations to a plurality of other memory devices;

receiving, from a requestor, a data burst command indicating an upcoming data burst event;

determining an expected current utilization during the data burst event;

determining whether the expected current utilization during the data burst event satisfies a threshold criterion;

responsive to determining that the expected current utilization during the data burst event does not satisfy the threshold criterion, pausing one or more other ongoing operations not associated with the data burst event that are being executed on a memory device until the expected current utilization during the data burst event satisfies the threshold criterion; and responsive to determining that the expected current utilization during the data burst event satisfies the threshold criterion, providing, to the requestor, an indication that the data burst event is approved.

14. The method of claim 13, wherein determining the expected current utilization during the data burst event comprises combining the current utilization associated with the one or more operations with an estimated current utilization associated with the data burst event.

15. The method of claim 13, wherein determining whether the expected current utilization during the data burst event satisfies a threshold criterion comprises determining whether the expected current utilization during the data burst event will remain below a maximum allowable current budget.

16. The method of claim 13, wherein providing the indication that the data burst event is approved comprises setting a corresponding bit in a status register to a specific value, wherein the requestor is to periodically poll the status register to determine if the corresponding bit is set to the specific value.

17. The method of claim 13, further comprising:

performing one or more operations corresponding to the data burst event, wherein the one or more operations correspond to a period of uninterrupted data transfer either to or from the memory device;

receiving, from the requestor, a data burst release command indicating that the data burst event is completed; and responsive to receiving the data burst release command, resuming the paused one or more other ongoing operations being executed on the memory device.

* * * * *